Sept. 10, 1957 L. V. BLACK 2,805,520
METHOD FOR BENDING AND TEMPERING GLASS
Filed June 10, 1952 3 Sheets-Sheet 1

INVENTOR.
LLOYD V. BLACK
BY
Oscar L. Spencer
ATTORNEYS

Sept. 10, 1957 L. V. BLACK 2,805,520
METHOD FOR BENDING AND TEMPERING GLASS
Filed June 10, 1952 3 Sheets-Sheet 2

INVENTOR.
LLOYD V. BLACK
BY
Oscar L. Spencer
ATTORNEYS

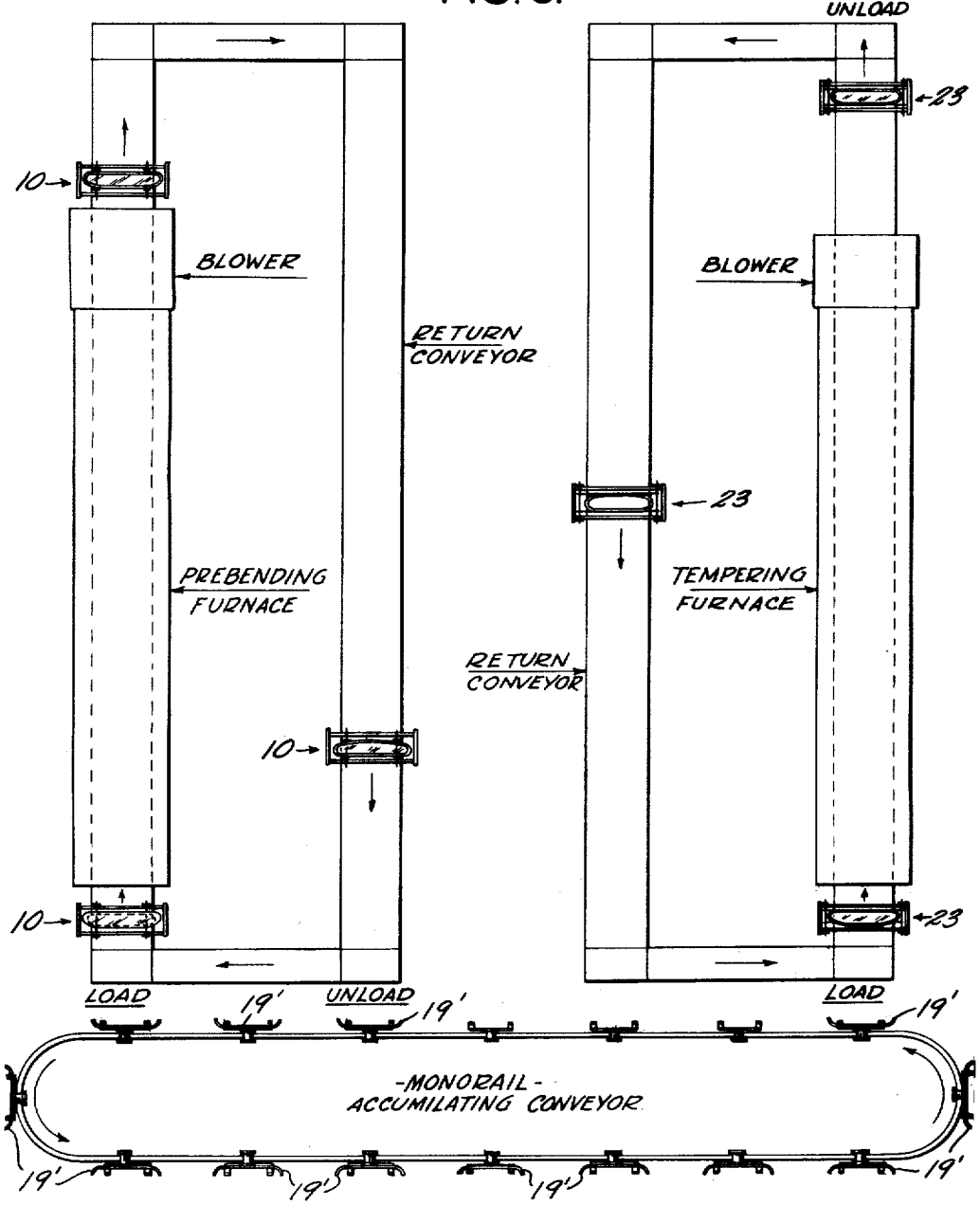

United States Patent Office 2,805,520
Patented Sept. 10, 1957

2,805,520

METHOD FOR BENDING AND TEMPERING GLASS

Lloyd V. Black, Tarentum, Pa., assignor to Pittsburgh Plate Glass Company, Allegheny County, Pa., a corporation of Pennsylvania Application June 10, 1952, Serial No. 292,695

6 Claims. (Cl. 49—84)

This invention relates to a method of bending and tempering flat plates of glass. More particularly the invention relates to bending and tempering glass plates which have more or less pointed ends with deep or sharp bends, such as are used for the rear windows or lights in recent models of automobiles.

In a prior method of bending and tempering rear lights for automobiles, rectangular blanks of plate glass from $3/32$ to $1/4$ inch in thickness and of a size to produce the required bent shape have been mounted in horizontal position upon hinged, metal bending molds. These molds have been concave in shape, and initially only the ends of the glass blank are supported by the ends of the mold. The molds, with the glass blanks mounted thereon, then have been passed through a long heating lehr where the glass is heated above 950° F. As the central portion of the heated glass sags under its own weight, the hinged mold folds to provide a supporting surface for the glass which conforms to the desired final shape of the bent plate. Skeleton molds are used, the glass being supported only around its periphery. The molds then emerge from the lehr and pass through a blower where the glass is chilled suddenly by blasts of air directed against the opposite surfaces of the glass from the blower pipes.

This sudden cooling imposes compression stresses on the opposite exterior faces of the glass, leaving the center portion in tension. Such a glass is very strong, and when it breaks it shatters into more or less small pieces with fairly rounded corners, looking a lot like oversized confetti. The strength of the glass and its peculiarity of shattering into small pieces has permitted the substitution of tempered glass for laminated glass in automobile rear windows.

Until recently, automobile glass has had essentially square ends. Such glass can be laid on a female skeleton mold and bent and tempered in one process as described above. The large rear windows of the 1951 and subsequent models of automobiles have very deep bends in the end portions thereof, and the ends are more or less pointed instead of being square. Moreover these pointed extremities generally are to one side of the center line, making it difficult or impossible to support the blank on the female mold, because the glass rests only on the two extreme points and tends to tilt and slide off from the mold.

It is an object of the invention to provide an improved method of bending and tempering flat plates of glass. It is an object of the invention to provide a method of bending and tempering relatively long plates of glass which, when finished, have sharp or deep bends in the end portions. It is a further object of the invention to provide a method of bending and tempering plates of glass having more or less pointed ends, or extremities located to one side of the center line. It is another object of the invention to provide a two-step method of bending and tempering plates of glass in which the glass first is bent to the desired shape and then is tempered. Other objects and advantages of the invention will appear as the description proceeds.

Preferred apparatus suitable for carrying out the method of the present invention has been selected for purposes of illustration and is shown in the accompanying drawings, wherein:

Figure 6 is a schematic layout diagram showing the sequence of steps in the method of bending and tempering glass according to the present invention.

If a glass blank having pointed ends, or extremities located to one side of the center line, be placed on a convex or male skeleton mold it can be balanced at the center and then bent down to fit the surface of the mold by the application of heat. It has been found by applicant that when glass is prepared on such molds, the ends must be heated much more intensely than the center because of the gradually decreasing leverage as the glass bends down to the mold. Otherwise it will be found that the glass has sagged badly at the center, transversely of the blank. By using localized heat, or shields, most of the heat can be concentrated on the ends of the glass blank so that the glass can be bent down to the male mold with practically no cross sag at the center.

Because of the great temperature differential between the ends and the center of glass bent this way, the glass cannot be tempered in the same operation. However, the bent glass on the male mold can be cooled fairly rapidly to a safe handling temperature without danger of breakage. Applicant has found that when a plate of $1/4$ inch glass is withdrawn from a bending furnace directly into still air it requires about 15 minutes for the glass to cool to a temperature of about 200° F., so that it can be handled safely. Glass cooled in this way tends to cool faster on the top surface than at the bottom, and the glass tends to curl downwardly and clamp the mold. If desired, a stream of air moving at the rate of about 500 feet per minute can be directed on the under side of the glass to hasten the cooling. This will cool the glass sufficiently so that it can be handled safely in about half the time required for cooling in still air, and it will prevent much of the downward curl, leaving the glass free on the mold. If higher velocity air is used, the glass is liable to break.

According to the present invention the elongated glass plates or blanks are bent to substantially their final desired shape through the action of localized heat on the glass while it is balanced on a male bending mold. Then after the bent plates have been cooled on the bending molds sufficiently to permit safe handling they are inverted and placed on female tempering molds which support the bent plates around their peripheries. The bent plates, supported on the female tempering molds, are introduced into a second furnace, heated evenly, and then tempered by chilling.

Figure 1:
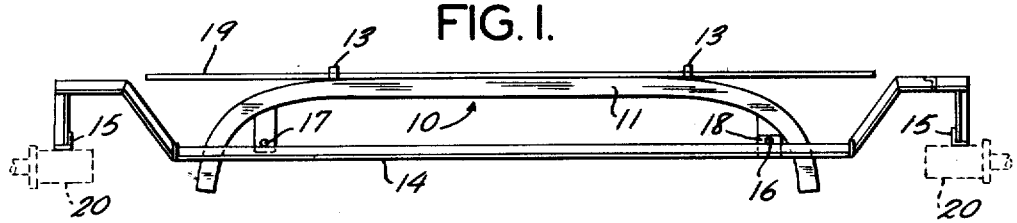
Figure 1 is a side elevation of a male bending mold having a flat glass blank mounted thereon preparatory to bending.
Figure 2:
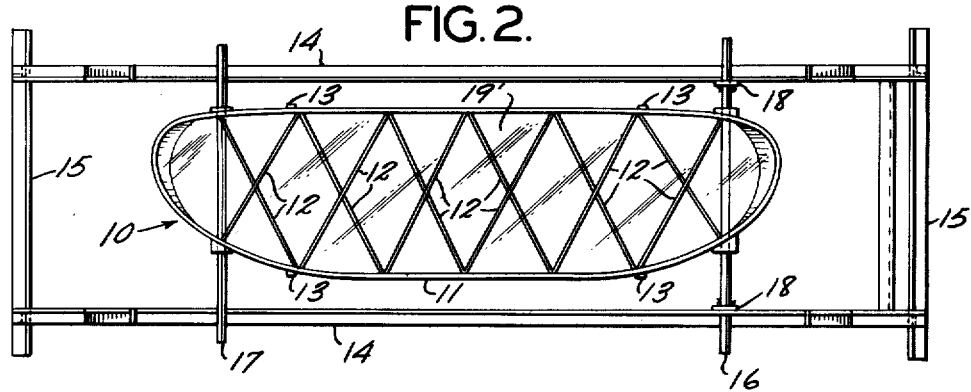
Figure 2 is a top plan view of the mold of Figure 1, but showing the glass bent to conform to the mold surface.

Referring to Figures 1 and 2, the male bending mold, designated generally by the reference numeral 10, comprises a peripheral member 11 and cross bracing rods 12. The peripheral member 11 preferably will be a steel strip bent to conform closely to the desired final shape and contour of the glass, and closed on itself as by welding.

As can be seen in the drawings, the strip is formed to the mold shape so that one edge thereof serves as the mold surface to support the glass. If desired, the mold may be made very slightly smaller than the glass, so that the edge of the glass will project a little over the edge of the mold. The cross bracing rods 12 may be welded to the peripheral member 11 at or near its lower edge so that the glass will not contact the bracing rods and possibly be deformed thereby during the bending operation. The skeleton mold construction is desirable because it facilitates heating and cooling of the glass supported on the mold.

Conveniently the upper part of the bending mold will be provided along its sides with ears or lugs 13 to position the flat glass blank 19 properly with respect to the mold surface when the blank is placed on the mold for heating and bending. This insures that the bent glass will be supported around its periphery by the mold, and bent to the desired shape.

The bending mold is provided on its under side, near each end, with a transverse mounting rod. These rods, designated 16 and 17, are secured in ears projecting downwardly from the peripheral member 11, and the rods project beyond the sides of the mold. The ends of these rods rest on the end portions of the drop side members 14 of a frame which carries the mold through the lehr, and along a conveyor during the cooling operation after the mold emerges from the lehr. As shown, this frame is rectangular in shape when viewed from above, the drop side members 14 being connected by end members 15, conveniently all made of angle iron and of welded construction. The end members 15 constitute runners which are supported on rows of stub rollers 20 arranged along opposite sides within the lehr, the runners moving along over these rollers to carry the mold through the lehr.

Conveniently the ends of the transverse rod 16 pass through apertured plates 18 secured on the drop side members 14, thus providing a hinge connection between the bending mold and its frame. The transverse rod 17 merely rests on the drop side members and is free to move thereon to accommodate for thermal expansion and contraction of the mold during the heating and cooling of the glass on the mold.

Figure 3:
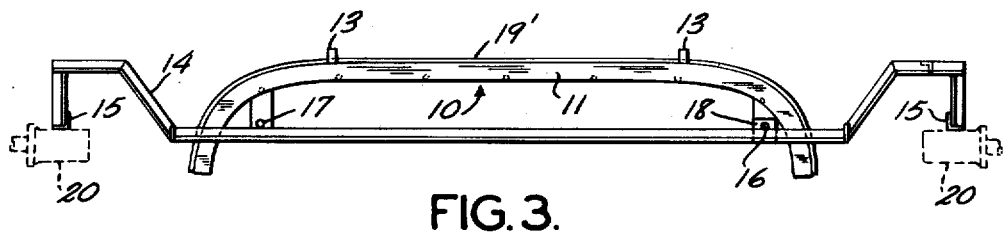
Figure 3 is a view similar to Figure 1, except that it shows the glass bent to conform to the mold surface.

Figure 2 shows the bending mold and a glass blank after the glass has been bent to conform to the upper surface of the mold, the bent glass being designated 19'. Figure 3 is a view similar to Figure 1, except that it shows the glass bent on the mold as in Figure 2.

After the flat glass blank has been heated on the male bending mold to cause it to bend and conform to the mold surface the mold is withdrawn from the prebending furnace and the glass is cooled to about 200° F., either in still air or by directing a stream of air against the under side of the glass. Then the bent glass is removed from the mold by men wearing asbestos faced gloves and, after being inverted, the glass is placed on a female tempering mold. The tempering mold has a mold surface which conforms to the shape of the bent glass and supports the glass around its periphery, and the glass is held without danger of slipping on the mold regardless of the shape of its ends.

Figure 4:
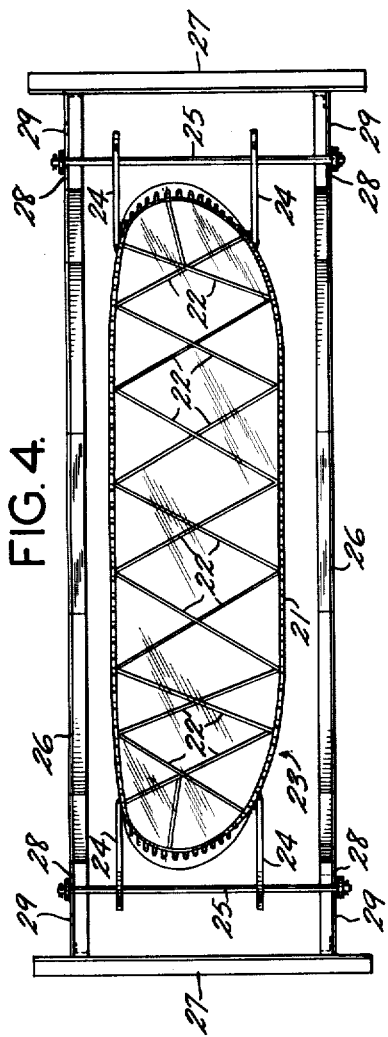
Figure 4 is a top plan view of the female tempering mold with a prebent glass plate mounted thereon.
Figure 5:
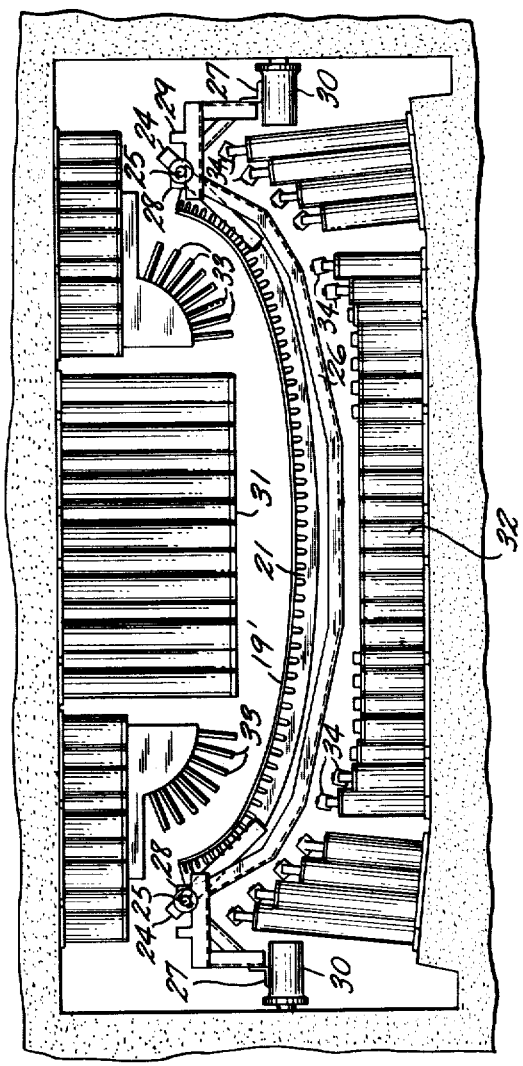
Figure 5 is a view showing the tempering mold of Figure 4 in the blower as it emerges from the tempering lehr.

The female tempering mold is shown in Figures 4 and 5 and is designated generally by the reference number 23. The tempering mold comprises a peripheral member 21 and cross bracing rods 22, the construction being generally similar to that of the bending mold except that in this case it is the concave surface which constitutes the mold surface. The upper or mold surface edge of the peripheral member 21 may be provided with regularly spaced slots as shown to form a mold surface which is not in continuous contact with the edge of the glass when the prebent glass rests on the mold. This is desirable from the standpoint of uniform tempering of the glass when it is chilled.

As shown, similar mounting means are provided for the two ends of the tempering mold 23. Rigidly connected near each end of the tempering mold, as by welding, are two arms 24, by which the mold is suspended from the transverse mounting rods 25. The ends of the mounting rods 25 rest on the end portions of the drop side members 26 of a frame which carries the mold through the tempering lehr. Movement of the mounting rods longitudinally of the drop side members desirably is limited by stops 28 and 29. The ends of the drop side members are connected by end members 27 which serve as runners to carry the frame along over rows of stub rollers 30 arranged along opposite sides within the lehr. The frame which carries the mold conveniently may be made of angle iron and of welded construction.

Figure 5 shows the tempering mold within the blower through which it passes as it emerges from the tempering lehr. The blower directs currents of air against the upper and lower surfaces of the heated glass to chill and temper it. As shown, the blower comprises banks 31 and 32 of vertically arranged air pipes located, respectively, above and below the central part of the glass, radially disposed banks of air pipes 33 located above the sharply bent end portions of the glass, and other banks of air pipes 34 having radially disposed nozzles located under the bent end portions of the glass. These air pipes all are connected to a supply of air under pressure and they have small end openings which emit the air against the glass surfaces to chill and temper the glass.

The method of this invention requires the use of two furnaces or lehrs, one in which the heat is concentrated on the ends of the glass for bending the flat glass blank, and the other in which the prebent glass is heated evenly for tempering. After the glass has moved through the first furnace on a bending mold it must be inverted and transferred to a tempering mold before it enters the second furnace. Figure 6 shows a system layout whereby the process of the present invention may be used to produce automobile backlights commercially without the necessity for perfect synchronization of the two furnaces so that a tempering mold is always ready to receive glass taken from a bending mold.

The prebending furnace, shown at the left in Figure 6, is a lehr several hundred feet long through which a plurality of bending molds will be moving continuously, spaced one after the other, the end runners of the mold frames being supported on the rows of stub rollers extending along opposite sides within the lehr. A flat glass blank is loaded onto each bending mold 10 at the "Load" position, just before the mold enters the lehr, the blank being balanced and supported on the mold as shown in Figure 1. The glass is heated gradually as it passes through the lehr, the speed and temperature being regulated so that the glass bends to conform to the mold surface during its passage through the lehr. Emerging from the prebending furnace, the mold with its bent glass is picked up by a return conveyor and the glass is cooled as the mold is carried back to the loading station. If, for example, the passage of the glass through the prebending furnace requires about 7½ minutes, and the return conveyor carries the molds at the same speed as they move through the furance, the total length of the return conveyor preferably will be about twice the length of the furnace so as to provide the 15 minutes required for cooling the glass to a safe handling temperature. If desired, the cooling may be hastened by passing the glass through a cooler when it emerges from the furnace. This cooler directs a current of air against the underside of the glass while it remains on the mold.

When the bending molds carried by the return conveyor reach the "Unload" position the bent glass plates 19' are removed from the molds and placed on an accumulating conveyor. This conveyor, which may be a monorail or chain conveyor, carries the bent plates to the tempering furnace. By employing the accumulating conveyor it is unnecessary to have perfect synchronization of the two furnaces, and the bent plates may cool further before they are loaded on the tempering molds. By starting the prebending furnace slightly ahead of the tempering furnace there always will be room to store the glass taken from the bending molds, and glass always will be available to place on the tempering molds.

The tempering furnace, shown at the right in Figure 6, is a lehr similar to that of the prebending furnace. At the "Load" position of the tempering furnace the prebent plates 19' are removed from the accumulating conveyor and loaded onto tempering molds 23 just before the molds enter the furnace. As these molds move through the tempering furnace the prebent glass plates carried thereby are heated evenly to the tempering temperature, and then they are chilled as they emerge from the lehr through the blower, shown in more detail in Figure 5. The tempered bent plates then are unloaded from the molds 23 and the molds are carried back to the "Load" position of the tempering furnace by a return conveyor. In Figure 6 only a few bending molds and tempering molds are shown on the return conveyors, but it will be understood that in commercial operation there would be many more.

It will be understood that the invention herein disclosed may be modified and embodied within the scope of the subjoined claims.

I claim:

1. A method of bending elongated, non-rectangular glass sheets into shapes having spaced, substantially parallel extremities which comprises supporting an unbent glass sheet intermediate its ends on a bending mold having an upper shaping surface convex in elevation and leaving its end portions unsupported while the sheet is disposed horizontally, heating the sheet, concentrating the heating pattern on the unsupported end portions of the glass sheet to cause them to sag under their own weight into substantially vertical dispositions so that the glass sheet embraces the upper shaping surface with the upper surface of the glass sheet becoming convex and the bottom surface becoming concave, and directing a current of cooling fluid against the bottom concave surface only of the bent sheet to cool the bent glass sheet to a temperature on the order of 200° F. whereby the embrace between the bent glass sheet and the upper shaping surface is loosened to facilitate its removal.

2. A method according to claim 1, wherein an air current is directed against the bottom concave surface of the bent sheet at a velocity not exceeding 500 feet per minute.

3. A method according to claim 1, wherein the end portions of the sheet are supported after they sag into substantial conformity with their desired final bent shape until they are cooled.

4. A method according to claim 1, wherein the bent glass sheet is subsequently tempered.

5. A method according to claim 4, wherein the bent glass sheet is inverted and its periphery supported on a skeleton structure of concave configuration for tempering.

6. A method of fabricating tempered, bent sheets of glass having extremities sharply bent relative to their central portion from elongated flat sheets precut to a laterally asymmetrical outline comprising balancing each flat sheet intermediate its ends on a bending mold having an upper shaping surface convex in elevation and including sharply bent regions adjacent its extremities, heating the glass sheet thus supported on the bending mold, concentrating the heating pattern on the unsupported end portions of the glass sheet to cause them to sag under their own weight and conform to the shape of the mold so that the upper surface of the glass sheet becomes convex and the bottom surface of the glass sheet becomes concave, directing a current of cooling fluid against the bottom concave surface only of the bent sheet to cool the bent glass sheet to a temperature on the order of 200° F. whereby the embrace between the bent sheet and the convex mold is loosened to facilitate removal of the bent sheet, removing the bent sheet from the convex mold, inverting the cooled sheet, supporting the inverted glass sheet about its periphery on a skeleton tempering mold having an upper shaping surface concave in elevation, reheating the supported glass sheet to above the tempering temperature and suddenly chilling the reheated sheet to temper the latter.

References Cited in the file of this patent

UNITED STATES PATENTS

| | | |
|---|---|---|
| 1,107,072 | Houze | Aug. 11, 1914 |
| 1,454,200 | Wells et al. | May 8, 1923 |
| 2,213,406 | Paddock et al. | Sept. 3, 1940 |
| 2,259,727 | Bowers | Oct. 21, 1941 |
| 2,297,315 | Owen | Sept. 29, 1942 |
| 2,376,872 | Harris | May 29, 1945 |
| 2,408,526 | Minton | Oct. 1, 1946 |
| 2,450,297 | Pearse et al. | Sept. 28, 1948 |
| 2,518,951 | Smith | Aug. 15, 1950 |
| 2,525,112 | Baker | Oct. 10, 1950 |
| 2,646,647 | Bamford et al. | July 28, 1953 |

FOREIGN PATENTS

| | | |
|---|---|---|
| 591,069 | Great Britain | Aug. 6, 1947 |
| 616,445 | Germany | July 29, 1935 |

Dedication 2,805,520.—*Lloyd V. Black*, Tarentum, Pa. METHOD FOR BENDING AND TEMPERING GLASS. Patent dated Sept. 10, 1957. Dedication filed July 25, 1973, by the assignee, *PPG Industries, Inc.*

Hereby dedicates the remainder of its term to the free use and benefit of the People of the United States.

[*Official Gazette December 4, 1973.*]